United States Patent Office 3,284,451
Patented Nov. 8, 1966

3,284,451
ACTIVATED ESTERS OF 7-AMINO-
CEPHALOSPORANIC ACID
Lee C. Cheney, Fayetteville, John C. Godfrey, Syracuse,
Leonard B. Crast, Jr., North Syracuse, and Joyce R.
Luttinger, Syracuse, N.Y., assignors to Bristol-Myers
Company, New York, N.Y., a corporation of Delaware
No Drawing. Filed July 22, 1965, Ser. No. 474,150
8 Claims. (Cl. 260—243)

This invention relates to certain novel and highly useful, activated esters of 7-aminocephalosporanic acid (also named $\Delta^3$-7-aminocephalosporanic acid or 7-ACA) and salts thereof and to methods both for their preparation and for their use to make both old and new 7-acylamino-$\Delta^3$-cephalosporanic acids, i.e. cephalosporins.

It was the primary objective of the present invention to provide new intermediates for use in the production of cephalosporins which would offer alternative routes to old cephalosporins (and in particular provide practical, commercial-scale methods for producing certain cephalosporins previously available only in laboratory quantities) and would also make possible the synthesis of novel cephalosporins not attainable by the methods presently available.

The primary objective of the present invention was achieved by the provision, according to the present invention, of activated esters of 7-aminocephalosporanic acid of the formula

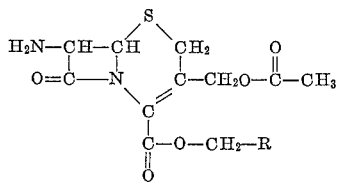

wherein R represents (lower)alkanoyl, N-phthalimido, benzoyl, naphthoyl, furoyl, thenoyl, nitrobenzoyl, halobenzoyl, methylbenzoyl, methanesulfonylbenzoyl or phenylbenzoyl; and acid addition salts thereof.

The preferred embodiments of the present invention are the activated esters of 7-aminocephalosporanic acid of the formula

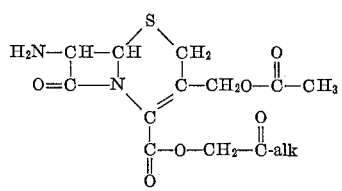

wherein alk represents (lower)alkyl; and acid addition salts thereof, and the activated esters of 7-aminocephalosporanic acid of the formula

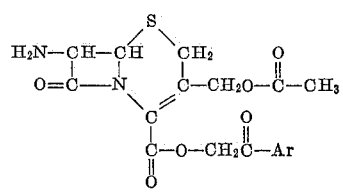

wherein Ar represents phenyl or substituted phenyl; and acid addition salts thereof.

The activated esters of 7-aminocephalosporanic acid included within the scope of the present invention are those which by simple test are stable enough to avoid self-condensation but at the same time are labile enough to allow the carboxyl-protecting function, i.e. the activated ester group, to be removed when desired to regenerate the carboxyl group without destroying the sensitive $\beta$-lactam ring as described below, e.g. by treatment with sodium thiophenoxide in an inert solvent according to Sheehan et al., J. Org. Chem., 29, 2006 (1964). This removal of the ester group is to be practiced on these esters themselves (to produce 7-aminocephalosporanic acid) or after they have been acylated (to produce a cephalosporin).

These activated esters were found to have such advantages (over use in former syntheses of 7-aminocephalosporanic acid itself or its salts) as vastly improved solubility in organic solvents, greater thermal stability and improved stability toward acidic reagents in addition to their use as previously mentioned to make otherwise unobtainable, new cephalosporins and to make cephalosporins such as 7-($\alpha$-aminophenylacetamido)-cephalosporanic acid which were previously prepared only in very low yield by a most expensive and complicated process.

The activated esters of 7-amino-cephalosporanic acid of the present invention are prepared by a two-step general method, as follows:

A freely available cephalosporin such as cephalosporin C or 7-(2-thienylacetamido)cephalosporanate ("Keflin Sodium"), is reacted (preferably at about room temperature up to about 40° C. in an anhydrous solvent such as dimethylformamide or N,N-dimethylacetamide) with one equivalent of an active halide of the formula Cl—CH$_2$—R or Br—CH$_2$R wherein R has the meaning set forth above to produce an activated ester of the cephalosporin from which the side-chain is then removed by the enzymatic process previously used on penicillins G and V themselves (cf. Rolinson et al., U.S. Patents 3,014,845 and 3,014,846; U.S. Patent 3,239,428, issued March 8, 1966, on application Serial No. 363,999, filed April 30, 1964, by our colleagues H. Takeda, I. Iwatsuki and T. Miyano; U.S. Patents 3,161,573, 3,150,059, 3,144,395, 3,127,326, 3,121,667, 3,116,218 and 3,109,779; British patent specifications 891,173, 897,617, 924,455 and 957,685) or used on cephalosporin C (French Patent 1,357,977).

These procedures may be summarized as follows in equations in which the nucleus

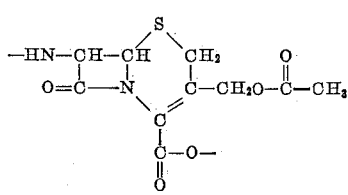

is represent by ACA, X represents chloro or bromo,

TSOH represents p-toluenesulfonic acid and R is as defined above:

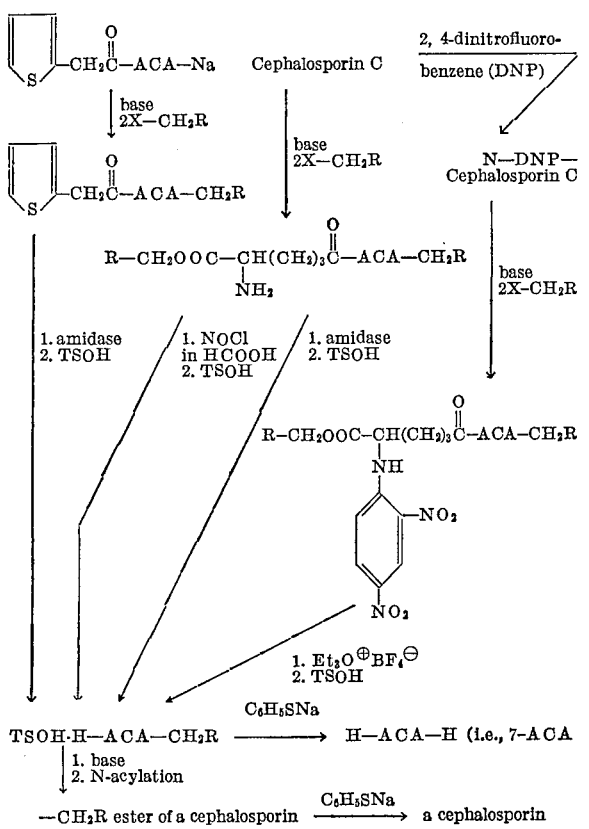

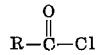

One preferred procedure uses chloroacetone or bromoacetone. The other preferred procedure uses phenacyl bromide, phenacyl chloride or a ring-substituted phenacyl bromide or chloride.

Alternatively, the activated esters of cephalosporins can be prepared by treatment of a mixed anhydride of the cephalosporin with an alcohol of the formula HO—$CH_2R$ wherein R has the meaning set forth above essentially by following well-known procedures; cf. D. A. Johnson, J. Amer. Chem. Soc., 75, 3636 (1953); R. L. Barnden et al., J. Chem. Soc. 3733 (1953).

The activated esters of 7-aminocephalosporanic acid of the present invention are also prepared by the following method;

7-aminocephalosporanic acid in the form of a salt such as the triethylammonium salt is mixed at about 20–40° C. in an inert solvent such as methylene chloride or dimethylformamide with about one or two equivalents of one of the active halides described above to form the desired activated ester of 7-aminocephalosporanic acid, which is conveniently isolated as its acid addition salt with p-toluenesulfonic acid.

A fourth procedure for the preparation of the activated esters of 7-aminocephalosporanic acid of the present invention comprises the treatment with p-toluenesulfonic acid of an activated ester made from 7-(N-tritylamino) cephalosporanic acid and an alcohol of the formula $HOCH_2R$ wherein R has the meaning set forth above. The reaction is carried out in an inert solvent such as dry acetone at a temperature in the range of 0–40° C., preferably at about room temperature, using approximately equimolar weights of ester and acid.

The activated esters of 7-aminocephalosporanic acid of the present invention are basic compounds, i.e. primary amines, and form acid addition salts upon treatment with one equivalent of organic or inorganic acids such as hydrochloric, sulfuric, sulfamic, hydrobromic, tartaric, hydriodic, glycolic, citric, maleic, phosphoric, succinic, acetic and the like. Such salts need not be nontoxic or pharmaceutically acceptable as their primary utility is in the recovery of these products for use in later reactions, e.g. acylation, in which the acid cation does not appear in the final product.

When desired, the products of the present invention are converted to the corresponding activated esters of 7-acylcephalosporanic acids by reaction with an acylating agent for a primary amine, i.e. with an acid chloride of the formula $$R-\overset{O}{\underset{\|}{C}}-Cl$$

or the functional equivalent of said acid chloride as an acylating agent for a primary amino group. Such equivalants include the corresponding carboxylic acid bromides, acid anhydrides, including mixed anhydrides and particularly the mixed anhydrides prepared from stronger acids such as the lower aliphatic monoesters of carbonic acid of alkyl and aryl sulfonic acids and of more hindered acids such as diphenylacetic acid. In addition, an acid azide or an active ester or thioester (e.g. with p-nitrophenol, thiophenol, thioacetic acid) may be used or the free acid itself may be coupled by the use of enzymes or of a carbodiimide reagent [cf. Sheehan and Hess J. Amer. Chem. Soc., 77, 1067, (1955)], or of an alkynylamine reagent [cf. R. Buijle and H. G. Viehe, Angew. Chem., International Edition, 3, 582 (1964)], or of a ketenimine reagent [cf. C. L. Stevens and M. E. Monk, J. Amer. Chem. Soc., 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. In such instances, R represents any desired radical which will become the side-chain of the ultimate cephalosporin (in the sense that the benzyl group is the side-chain of penicillin G) which is formed on subsequent removal of the activated ester group to liberate the free carboxyl. Acylation with a free acid and the carbodiimide reagent is particularly useful as it is effective with acids which cannot be converted easily or at all to acid halides or acid anhydrides. These reactions are preferably carried out at about 0–25° C. in an anhydrous, inert solvent such as dry acetone using the free base form of the activated ester of 7-aminocephalosporanic acid, which may be prepared in situ from a salt thereof if desired. In addition to the acylating agent, a mole of a base such as triethylamine is added if acid is liberated, as by use of an acid chloride or anhydride. The product is then isolated by conventional techniques, e.g. by removal of the solvent followed by solvent recrystallization.

Thus in a typical illustration of the carbodiimide procedure, 0.5 millimole of phenacyl 7 - aminocephalosporanate (free base) and 0.5 millimole of dicyclohexylcarbodiimide are dissolved in 3.0 ml. methylene chloride. To this solution there is added a solution in 1.0 ml. pure dimethylformamide of 0.5 millimole of α - aminophenylacetic acid hydrochloride. After standing at 25° C. for 30 minutes the insoluble dicyclohexylurea is removed by filtration. Dilution of the filtrate with 50–75 ml. ether then precipitates the product, phenacyl 7 - (α - aminobenzylacetamido)cephalosporanate hydrochloride.

The activated esters of 7 - acylaminocephalosporanic acids thus obtained are then cleaved by Sheehan's sodium thiophenoxide method to the sodium salts of the corresponding cephalosporins. To each mole of the former there is added about one or two moles of sodium thiophenoxide dissolved in a dry inert solvent such as dimethylformamide or dimethylsulfoxide. The mixture is stirred at about room temperature until the reaction is completed (which often requires less than one hour) and the cephalosporin so-produced is recovered in the conventional manner, e.g. by solvent extraction based on the acidic nature of the carboxyl group or by direct precipitation upon addition of acetone, ethyl acetate or the like. Temperatures as low as 5° C. are useful but require longer reaction times and often give lower yields than are obtained at 20–35° C., or, preferably, at about 25° C.

The activated esters of 7 - acylaminocephalosporanic acids can also be converted to the corresponding cephalosporins by cautious treatment with other bases such as sodium hydroxide or sodium acetate or by exposure to ultraviolet light.

The same methods can be used to convert to 7-aminocephalosporanic acid itself the activated esters of 7-aminocephalosporanic acid obtained by the consecutive steps of forming an activated ester of a cephalosporin and then enzymatically removing its side chain.

The following examples will serve to illustrate but not to limit the present invention. All temperatures are given in degrees centigrade.

Example 1

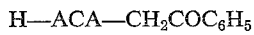

A. *Phenacyl 7 - (2 - thienylacetamido) - $\Delta^3$ - cephalosporanate.*—To a suspension of 1.138 g. (2.72 millimole) of sodium 7 - (2 - thienylacetamido) - $\Delta^3$ - cephalosporanate ("Keflin Sodium") in 20 ml. of dimethylacetamide (DMAc) was added 0.430 g. (2.78 millimole) of 2 - chloroacetophenone. The mixture was stirred at 25° for 2 hours and 40 minutes and then poured into 200 ml. of 5% sodium chloride solution. On addition of 50 ml. ether and vigorous agitation, the product, phenacyl 7 - (2 - thienylacetamido) - $\Delta^3$ - cephalosporanate, crystallized and was collected by filtration, washed with dry ether and dried in vacuo over phosphorus pentoxide. The yield was 562 mg. (40.2%), M.P. 165–167°. It was recrystallized for analysis from ethyl acetate, M.P. 169.5–171.0° C. Its ultraviolet spectrum in 95% ethanol had $\lambda_{max}$ 240 millimicrons ($\epsilon$=25,800) and an inflexion at 280 millimicrons ($\epsilon$=4,990). Its infrared spectrum (KBr) showed amide NH at 3300 cm.$^{-1}$, $\beta$-lactam at 1790 cm.$^{-1}$, phenacyl ester and acetate at 1745 cm.$^{-1}$, amide at 1705 cm.$^{-1}$ and amide II at 1540 cm.$^{-1}$. The NMR spectrum in CDCl$_3$ had a complex pattern totalling nine protons between 8.0 and 6.6$\delta$, which included the amide, phenyl and thiophene ring protons; one $\beta$-lactam proton at 5.8$\delta$ and the other at 5.0$\delta$; the two methylene protons of the phenacyl ester at 5.50$\delta$; the methylene carrying the acetoxy function at 5.0$\delta$; the methylene adjacent to the sulfur atom at 3.5$\delta$; and the methyl group of the acetoxy at 2.08$\delta$.

*Analysis.*—Calc'd. for C$_{24}$H$_{22}$N$_2$O$_7$S$_2$: C, 56.01; H, 4.31. Found: C, 56.45; H, 4.32.

B. *Phenacyl $\Delta^3$ - 7 - aminocephalosporanate, p-toluenesulfonate salt.*—A solution consisting of 500 mg. of phenacyl 7 - (2 - thienylacetamido)cephalosporanate, 50 ml. of acetone, 75 ml. of 0.2 M pH 7.0 phosphate buffer and 375 ml. *E. Coli* penicillin G amidase solution was incubated on a shaking apparatus in two 500 ml. Erlenmeyer flasks for 4.0 hours at 32°. At the end of this time 442 mg. of pure, crystalline starting material was filtered off and dried. The clear filtrate was extracted once with 250 ml. and twice with 125 ml. ethyl acetate, filtering as necessary to break mild emulsions. The combined extracts were dried briefly over sodium sulfate, filtered and 90 mg. p-toluenesulfonic acid monohydrate was added to the filtrate. The solvent was removed on the rotary evaporator at 35° and the dry residue was triturated with 50 ml. dry ether. The product, phenacyl $\Delta^3$ - 7 - aminocephalosporanate, p-toluenesulfonate salt, was collected by filtration and dried, 51.0 mg. (80%) of very light tan, crystalline solid, M.P. 85–90°. Its infrared spectrum (KBr) was very clear and had NH at 3430 cm.$^{-1}$, $\beta$-lactam 1790 cm.$^{-1}$, both ester carbonyls 1740 cm.$^{-1}$, phenyl ketone 1695 cm.$^{-1}$ and no trace of amide and amide II bands.

Example 2.—*Phenacyl 7-(2-thienylacetamido)-$\Delta^2$-cephalosporanate*

To a suspension of 2.269 g. (5.42 millimole) of "Keflin Sodium" in 40 ml. of DMAc was added 0.850 g. (5.50 millimole) of 2 - chloroacetophenone and the mixture was stirred at 25° for 17 hours. The mixture was poured into 400 ml. of 5% sodium chloride solution and the solid which separated was collected by filtration and dried. Trituration with about 200 ml. ether caused 0.66 g. of essentially pure $\Delta^3$ isomer to crystallize.

The ether filtrate was boiled down to about 100 ml., decanted from a gummy precipitate and allowed to stand at 25° for 16 hours. The crystalline precipitate which formed weighed 0.87 g. and was essentially pure $\Delta^2$ isomer. It was recrystallized from 15 ml. of hot ethyl acetate, 0.46 g. (16%), M.P. 127–129°. Its ultraviolet spectrum in 95% ethanol had $\lambda_{max}$ 240 millimicrons ($\epsilon$=25,600) and an inflexion at 280 millimicrons ($\epsilon$=2,640). Its infrared spectrum (KBr) was slightly different from the $\Delta^3$ isomer in that it had the $\beta$-lactam at 1780 cm.$^{-1}$, phenacyl and acetate esters as separate bands at 1750 and 1740 cm.$^{-1}$, amide carbonyl at 1705 cm.$^{-1}$ and amide II at 1530 cm.$^{-1}$. Its NMR spectrum in CHCL$_3$ was identical with that of the $\Delta^3$ isomer, with the exception of the signals for the protons at C$_2$ and C$_4$: the vinyl proton at C$_2$ appeared at 6.59$\delta$ and the proton at C$_4$ appeared at 5.2$\delta$. The corresponding methylene protons adjacent to the sulfur (C$_2$) in the $\Delta^3$ isomer (at 3.5$\delta$) were entirely absent.

Treatment of this product with amidase according to the procedure of Example 1 produces phenacyl $\Delta^2$-7-aminocephalosporanate as the p-toluenesulfonic acid salt.

Example 3

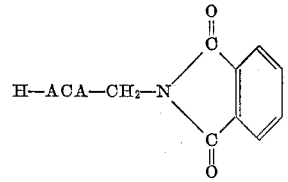

A suspension of 1.132 g. (2.71 millimole) of sodium 7-(2-thienylacetamido)-$\Delta^3$-cephalosporanate in 20 ml. N,N-dimethylacetamide containing 653 mg. (2.71 millimole) of N-bromomethylphthalimide became a clear solution after stirring for four minutes at 25° C. It was then stirred for one hour and poured into 200 ml. 5% sodium chloride solution. The product crystallized immediately and was collected by filtration and dried to give a quantitative yield of N-phthalimidomethyl 7-(2-thienylacetamido)-$\Delta^3$-cephalosporanate, M.P. 172.5–173.5°. It was recrystallized twice from ethyl acetate-Skellysolve-B, 1.00 g. (67%), M.P. 178.0–179.5°. Its infrared spectrum (KBr) had an NH at 3300 cm.$^{-1}$, $\beta$-lactam and first imide at 1780 cm.$^{-1}$, both ester bands and the second imide in a broad, intense band centered at 1735 cm.$^{-1}$, amide at 1685 cm.$^{-1}$ and amide II at 1525 cm.$^{-1}$.

Treatment of this product with amidase according to the procedure of Example 1 produces N-phthalimidomethyl-$\Delta^3$-7-aminocephalosporanate as the p-toluenesulfonic acid salt.

Example 4

H—ACA—CH₂COCH₃

To a vigorously-stirred suspension of 1.2 g. (2.8 millimole) of sodium 7-(2'-thienylacetamido)cephalosporanate in 25 ml. of DMAc at 22° was added 0.285 g. (3.08 millimole) of chloroacetone. After two hours the suspension was added slowly to 200 ml. of chilled (5°) and stirred 5% sodium chloride solution layered with 50 ml. of ether. The solid which separated at the interface was collected by filtration, washed with water and dried in vacuo over $P_2O_5$. This process afforded 0.6 g. of material of M.P. 122–124°. It was recrystallized by dissolution in a small volume of acetone which was then diluted with water and cooled to 5°. The crystalline sample of acetonyl 7-(2'-thienylacetamido)cephalosporanate thus collected had M.P. 142–143°. Absorption maxima in the infrared occurred at 3300 cm.$^{-1}$ (amide-NH); 1785 ($\beta$-lactam carbonyl); 1750–1730 (acetate, acetonyl and aliphatic ketone carbonyls); 1660 (amide carbonyl); 1530 (amide deformation). Resonance peaks in the NMR spectrum supported the structural assignment.

Treatment of this product with amidase according to the procedure of Example 1 produced acetonyl $\Delta^3$-7-aminocephalosporanate as the p-toluenesulfonic acid salt, M.P. 74° C. in 65% yield. The enzymatic conversion was assumed to be 100%; conversion of the corresponding phenacyl ester was only about 20%. The improvement obtained by the use of the acetonyl derivative is ascribed to its greater solubility in water.

Example 5

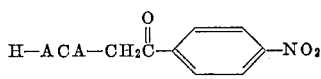

To a suspension of 1.124 g. (2.69 millimole) of "Keflin Sodium" in 20 ml. of dimethylacetamide was added 656 mg. (2.69 millimole) p-nitrophenacyl bromide. The mixture was stirred at 25° C. for 30 minutes. It became a clear solution during the first 5 minutes. It was poured into 200 ml. of 5% aqueous sodium chloride to precipitate as a crystalline solid the product, p-nitrophenacyl 7-(2-thienylacetamido)cephalosporanate, which was collected by filtration. It was dissolved in acetone and ethyl acetate and to remove moisture the solvents were removed by vacuum distillation at 35° C. The residue was dissolved in 75 ml. dry acetone and a trace of salt was filtered off. The acetone was removed by vacuum distillation and the residue was boiled briefly in 40 ml. ethyl acetate and this mixture was then cooled in ice and the purified product was collected by filtration and dried; 1.127 g., M.P. 179–181° C.

*Analysis.*—Calc'd for $C_{24}H_2N_3O_9S_2$: C, 51.51; H, 3.78. Found: C, 51.63; H, 3.83.

An additional 238 mg., M.P. 176–179°, was recovered from the filtrate by boiling it down and adding "Skellysolve B" (petroleum ether fraction of B.P. 60–68° C.) to the cloud point at the boiling point. The IR showed a very pure compound.

A repeat preparation using 5.48 gm. "Keflin Sodium" gave 6.81 g. of the same product.

Treatment of this product with amidase in the presence of a solubilizing agent according to the procedure of Example 1 produces p-nitrophenacyl $\Delta^3$-7-aminocephalosporanate as the p-toluenesulfonic acid salt.

Example 6

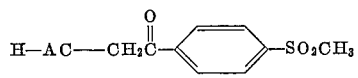

"Keflin Sodium" (1.1373 g.; 2.72 millimole) was suspended in 30 ml. dimethylacetamide and there was added 0.755 g. (2.72 millimole) of p-methylsulfonylphenacyl bromide. The mixture was stirred for 30 minutes at 24° C. After about 15 minutes the solution became clear and turned a light brown. It was poured into about 40 ml. brine to precipitate the crystalline product, p-methylsulfonylphenacyl 7-(2-thienylacetamide)-cephalosporanate, which was collected by filtration, washed thoroughly with water, dried over $P_2O_5$ in high vacuum and found to weigh 1.54 g. The product was dissolved in 200 ml. acetone and some insoluble material was filtered off. The filtrate was diluted with an equal volume of ethyl acetate, treated with charcoal and filtered through diatomaceous earth; the solvents were then removed by distillation in vacuo at 32° C. to leave the product as a residue which was added to 50 ml. ethyl acetate. The ethyl acetate was again removed by vacuum distillation and the residual product was collected by filtration with the aid of dry ether and found to weigh 1.21 g., M.P. 176–180°. The product was in the form of crystalline needles.

Treatment of this product with amidase according to the procedure of Example 1 produces p-methylsulfonylphenacyl $\Delta^3$-7-aminocephalosponarante as the p-toluenesulfonic acid salt.

Example 7

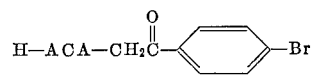

Substitution for the 2-chloroacetophenone in the procedure of Example 1 of an equimolar weight of p-bromophenacyl bromide produces p-bromophenacyl $\Delta^3$-7-aminocephalosporanate as its salt with p-toluenesulfonic acid.

Example 8

H—ACA—CH₂COCH₃

A suspension of 1.128 g. (2.69 millimole) of sodium 7-(2-thienylacetamido)-$\Delta^3$-cephalosporanate in 20 ml. of DMAc (N,N-dimethylacetamide) was treated with 0.368 g. (2.69 millimole) of bromoacetone and stirred at 25° for 45 minutes. The mixture became a clear solution after 7 minutes. It was poured into 200 ml. of 5% sodium chloride and layered with 40 ml. of ether. The product, acetonyl 7-(2-thienylacetamido)-$\Delta^3$-cephalosporanate, crystallized and was separated by filtration, 1.055 g. (82.5%), M.P. 137°. It was recrystallized twice from aqueous acetone, 48% purified yield, M.P. 143.5–145.0°. Both infrared and NMR spectra were well-defined and in complete agreement with the expected structure. In particular, the NMR spectrum showed that no $\Delta^2$ isomer was present.

*Analysis.*—Calc'd for $C_{19}H_{20}N_2O_7S_2$: C, 50.43; H, 4.45. Found: C, 50.98; H, 4.47.

A solution of 12.0 g. of acetonyl 7-(2-thienylacetamido) $\Delta^3$-cephalosporanate in 600 ml. of acetone was diluted to 12.0 l. with *E. coli* amidase solution and stirred at 33° for 2.0 hours. The solution was extracted with two 6.1 portions of ethyl acetate, filtering over diatomaceous earth to break the emulsions. The combined extracts were dried over sodium sulfate, filtered and 5.05 g. (1.00 equivalent) of p-toluenesulfonic acid monohydrate was added. The resulting solution was evaporated to dryness on the rotary evaporator, the residue dissolved in ca. 200 ml. of methylene chloride, treated with decolorizing charcoal and filtered. The filtrate was evaporated to a small volume and diluted with an excess of dry ether, which precipitated acetonyl $\Delta^3$-7-aminocephalosporanate, p-toluenesulfonate salt, 6.06 g. (45%), as an off-white, crystalline solid, M.P. 70–74°. A sample was reprecipitated from methylene chloride by addition of dry ether, with no change in melting point.

*Analysis.*—Calc'd for $C_{20}H_{24}N_2O_9S_2$: C, 47.99; H, 4.83; N, 5.60. Found: C, 47.73; H, 4.94; N, 5.23.

Example 9

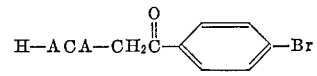

To 25 ml. methylene chloride was added 1.36 g. (0.005 mole) of 7-aminocephalosporanic acid followed by 1.4 ml. (0.010 mole) of triethylamine and the mixture was stirred for 15 minutes. The resulting solution was then evaporated under reduced pressure to a viscous oil which was redissolved in 25 ml. methylene chloride to which, with stirring, was added all at once a solution of 1.39 g. (0.005 mole) of p-bromophenacyl bromide in 25 ml. methylene chloride. The resulting solution was stirred for three hours at 22° C. and then extracted consecutively with three 50 ml. portions of water, three 50 ml. portions of 5% $NaHCO_3$ and three 50 ml. portions of water. The methylene chloride solution was then filtered through anhydrous $Na_2SO_4$ and then evaporated under reduced pressure to leave p-bromophenacyl 7-aminocephalosporanate as an oil.

This oily product was then dissolved in 50 ml. ethyl acetate and to it was added a solution of sautrated p-toluene-sulfonic acid hydrate in ethyl acetate until pH 2 was obtained. The ethyl acetate was then removed under reduced pressure and the resulting oil triturated with dry ether, collected by filtration and washed with dry ether to obtain 1.9 g. p-bromophenacyl 7-aminocephalosporanate p-toluenesulfonic acid salt for which the IR and NMR spectra were consistent with the expected structure. The product contained approximately 75% $\Delta^3$ isomer and 25% $\Delta^2$ isomer.

PREPARATION OF CEPHALOSPORINS

The activated esters of 7-aminocephalosporanic acid of the present invention are N-acylated as described above to give activated esters of cephalosporins which are then cleaved to produce cephalosporins either photolytically or by a nucleophilic and preferably mildly basic anion as illustrated in the preparations given below, which utilize activated esters of 7-(2'-thienylacetamido)cephalosporanate for illustrative purposes.

PREPARATION NO. 1

*Sodium 7-(2'-thienylacetamido)cephalosporanate.*—To a solution of 239 mg. (0.43 millimole) of p-nitrophenacyl 7-(2'thienylacetamido)cephalosporanate in 1 ml. of dry dimethyl sulfoxide (DMSO) was added with vigorous stirring over a period of 8 minutes, a solution of 56.8 mg. (0.43 millimole) of sodium thiophenoxide in 1 ml. DMSO. The resulting purple solution was added to 50 ml. of ice-water at pH 6.5. This solution was washed with 3 x 30 ml. of chloroform. The pH of the aqueous phase was then lowered to 2 by addition of 40% phosphoric acid and extractions were taken with 2 x 30 ml. of ethyl acetate. After the combined extracts had been washed with cold water and dried over magnesium sulfate, they were treated with 142 mg. (0.43 millimole) of a solution of 50% sodium 2-ethylhexanoate in ether. The crystalline, solid sodium 7-(2'-thienylacetamido)cephalosporanate which separated was collected by filtration, washed with ether and dried in vacuo. The yield was 84 mg., 42%. NMR spectrum showed the product was a mixture of $\Delta^3$ and $\Delta^2$ isomers in the ratio 39:61.

PREPARATION NO. 2

*Sodium 7 - (2'-thienylacetamido)cephalosporanate.*—A solution containing 489 mg. (0.95 millimole) of phenacyl 7-(2' - thienylacetamido)cephalosphoronate and 125 mg. (0.95 millimole) of sodium thiophenoxide in 2 ml. of dry dimethylformamide (DMF) was stored at room temperature (22°) for 15 minutes. Forty ml. of chloroform were added and the solution was extracted with these 15 ml. portions of a 3% sodium bicarbonate solution. The combined aqueous extracts were cooled (5°), layered with 25 ml. of ethyl acetate and acidified to pH 2 with 40% phosphoric acid with vigorous stirring. The layers were separated and the aqueous phase was extracted with 25 ml. of fresh ethyl acetate. The combined organic extracts were washed with two 20 ml. portions of water and dried briefly over magnesium sulfate. 315 mg. (0.95 millimole) of a 50% solution of sodium 2-ethylhexanoate in ether were added with stirring and the solution was chilled to 5°. The crystalline, solid sodium 7-(2'-thienylacetamido) cephalosporanate which precipitated was collected by filtration, washed with ether and dried in vacuo over $P_2O_5$. This process afforded 220 mg., 55% of material of M.P. 173–175° dec. NMR measurements showed that the product was a mixture of sodium 7-(2'-thienylacetamido)-3-acetoxymethyl-$\Delta^2$-cephem - 4 - carboxylate and sodium 7-(2'-thienylacetamido)-3-acetoxymethyl-$\Delta^3$-cephem-4-carboxylate in the ratio of approximately 9:1.

*Sodium 7 - (2' - thienylacetamido)-3-acetoxymethyl-$\Delta^2$ cephem-4-carboxylate.*—The experiment described immediately above was reproduced using 200 mg. (0.39 millimole) of phenacyl 7-(2'-thienylacetamido)-3-acetoxymethyl-$\Delta^2$-cephem-4-carboxylate and 103 mg. (0.78 millimole) of sodium thiophenoxide in 1 ml. of dry DMF. The yield of sodium salt was 70 mg., 43%. M.P. 175–177° dec. The product was shown by NMR measurements to be exclusively the $\Delta^2$-isomer.

PREPARATION NO. 3

*7-(2-thienylacetamido)cephalosporanic acid.*—A solution containing 55 mg. of phenacyl 7-(2-thienylacetamido) cephalosporanate and 0.028 ml. of aniline in 125 ml. of tetrahydrofuran was photolyzed in a fused quartz apparatus with a 100 watt Hanovia mercury arc lamp at 7° exterior temperature for 10 minutes. The solvent was removed in vacuo at 35° and the product, 7-(2-thienylacetamido)cephalosporanic acid, dried to a gummy fluff by the the application of high vacuum. The product was assayed by thin layer chromatography on silica gel, using the upper phase of a solvent mixture consisting of 80 parts of n-butanol, 20 parts of ethanol and 100 parts of water, followed by contact of the developed chromatogram with a plate covered uniformly with *B. subtilis* agar. After an appropriate incubation period, zones of inhibition of growth of the organism demonstrated the presence of active antibiotic. By this method, the product of photolysis was found to contain a single active substance whose $R_f$ (0.55) was identical with that of authentic 7-(2-thienylacetamido)cephalosporanic acid which was chromatographed alongside it for direct comparison. From the diameter of the zone of inihibition, it was estimated that the crude photolysis product contained approximately 10% by weight of 7-(2-thienylacetamido)cephalosporanic acid.

PREPARATION NO. 4

*Sodium 7-(2-thienylacetamido)cephalosporanate via ester hydrolysis.*—A solution of 400 mg. of acetonyl 7-(2-thienylacetamido)-$\Delta^3$-cephalosporanate in 200 ml. of acetone was diluted with 200 ml. of 0.20 molar pH 8.0 phosphate buffer and let stand at 25° for 24 hours. The acetone was removed by distillation at 35° and a faint turbidity was then removed by filtration. The filtrate was acidified to pH 2.0 with 6 N hydrochloric acid and extracted with two 150 ml. portions and three 80 ml. portions of ethyl acetate. The combined extracts were washed three times with 50 ml. portions of saturated sodium chloride solution, dried over sodium sulfate, filtered, evaporated in vacuo to about 100 ml. and treated with 0.22 ml. of a 50% solution of sodium 2-ethylhexanoate in n-butanol. The solution was then evaporated to dryness on the rotary evaporator at 35° and evaporated twice more with 50 ml. portions of ethyl acetate. When the volume of the last evaporation reached about 5 ml., the solution was diluted with 120 ml. of dry ether, precipitating the product, sodium 7-(2-thienylacetamido) cephalosporanate, as a white solid. It was collected by filtration and dried, 297 mg. (81%). Its NMR spectrum in $D_2O$ showed it to be a very clean mixture containing 40% of the $\Delta^3$ isomer and 60% of the $\Delta^2$ isomer.

We claim:
1. Activated esters of 7-aminocephalosporanic acid of the formula

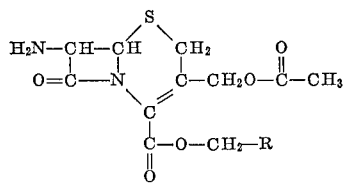

wherein R represents (lower)alkanoyl, N-phthalimido, benzoyl, naphthoyl, furoyl, thenoyl, nitrobenzoyl, halobenzoyl, methylbenzoyl, methanesulfonylbenzoyl or phenylbenzoyl; and acid addition salts thereof.

2. Activated esters of 7-aminocephalosporanic acid of claim 1 having the formula

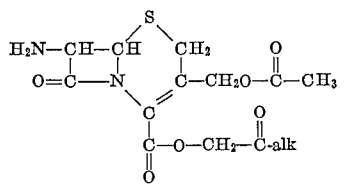

wherein alk represents (lower)alkyl; and acid addition salts thereof.

3. The activated ester of 7-aminocephalosporanic acid of claim 1 having the formula

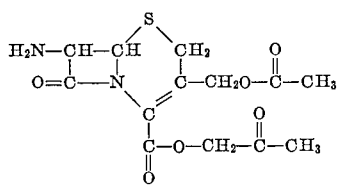

4. The activated ester of 7-aminocephalosporanic acid of claim 1 having the formula

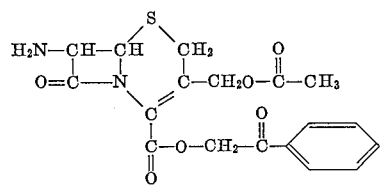

5. The activated ester of 7-aminocephalosporanic acid of claim 1 having the formula

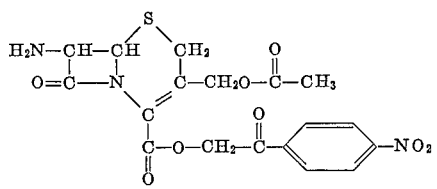

6. The activated ester of 7-aminocephalosporanic acid of claim 1 having the formula

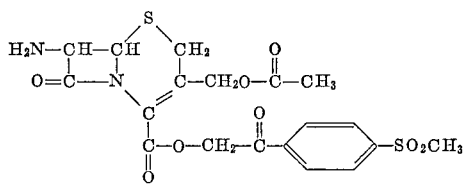

7. The activated ester of 7-aminocephalosporanic acid of claim 1 having the formula

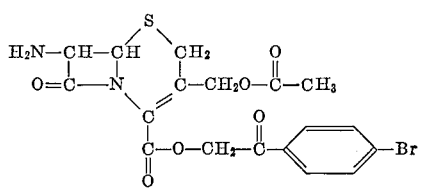

8. The activated ester of 7-aminocephalosporanic acid of claim 1 having the formula

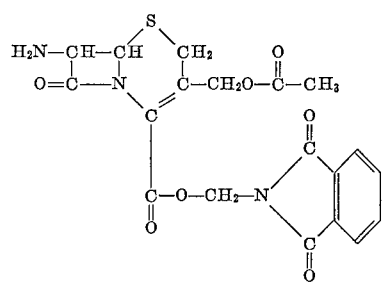

References Cited by the Applicant

UNITED STATES PATENTS

| | | |
|---|---|---|
| 2,578,570 | 12/1951 | McDuffie et al. |
| 2,941,995 | 6/1960 | Doyle et al. |
| 3,079,314 | 2/1963 | Hoover. |
| 3,093,638 | 6/1963 | Abraham et al. |

FOREIGN PATENTS

| | | |
|---|---|---|
| 810,196 | 3/1959 | Great Britain. |
| 953,695 | 3/1964 | Great Britain. |

OTHER REFERENCES

Sheehan et al., J. Org. Chem., 29, 2006-2008 (1964).
B. K. Koe, Nature, 195, 1200 (1962).

ALEX MAZEL, *Primary Examiner.*

HENRY R. JILES, *Examiner.*

JAMES W. ADAMS, JR., *Assistant Examiner.*